(12) United States Patent
Smith et al.

(10) Patent No.: US 6,975,618 B1
(45) Date of Patent: Dec. 13, 2005

(54) RECEIVER AND CORRELATOR USED TO DETERMINE POSITION OF WIRELESS DEVICE

(75) Inventors: Mark Smith, San Mateo, CA (US); Gerald Q. Maguire, Stockholm (SE)

(73) Assignee: Hewlett-Packard Development Company, L.P., Houston, TX (US)

( * ) Notice: Subject to any disclaimer, the term of this patent is extended or adjusted under 35 U.S.C. 154(b) by 893 days.

(21) Appl. No.: 09/893,153

(22) Filed: Jun. 26, 2001

(51) Int. Cl.[7] ............................................. H04J 3/06
(52) U.S. Cl. ...................... 370/350; 370/324; 370/509; 455/456.2; 455/456.5; 455/456.6
(58) Field of Search .................. 455/456.1, 456.2, 455/456.3, 456.4, 456.5, 456.6; 370/324, 370/350, 503, 509

(56) References Cited

U.S. PATENT DOCUMENTS

| | | | |
|---|---|---|---|
| 5,025,457 A * | 6/1991 | Ahmed | 375/354 |
| 6,748,226 B1 * | 6/2004 | Wortham | 455/456.6 |
| 6,839,023 B1 * | 1/2005 | Benco et al. | 342/357.1 |
| 2002/0183069 A1 * | 12/2002 | Myr | 455/456 |
| 2004/0002346 A1 * | 1/2004 | Santhoff | 455/456.1 |

OTHER PUBLICATIONS

Fredrik Christiansson, A Distributed, Mobile Positioning System For Wireless, Handheld Devices, Jun. 2000, pp. 1-97.*
Fredrik Christiansson, A Distributed, Mobile Positioning System For Wireless, Handheld Devices, Jun. 2000, pp. 1-97.

* cited by examiner

*Primary Examiner*—Brian Nguyen
*Assistant Examiner*—Tri H. Phan

(57) ABSTRACT

A system for identifying the position of a wireless device and transmitting that position back to the wireless device, the system comprising a plurality of receiver/correlators, each receiver/correlator being positioned at a fixed location in the network for receiving position request packets from the wireless cellular device, thereby generating a trigger signal each time a position request packet is received, the trigger signal used to record a local time, as indicated by an internal clock, at which the position request packet is received, and generating timing packets which include information about received position request packet, including time received. The system further including a central server for receiving the timing packets from the plurality of receiver/correlators and determining the position of the wireless device using the information in various timing packets.

9 Claims, 9 Drawing Sheets

RECEIVER AND CORRELATOR USED TO DETERMINE POSITION OF WIRELESS DEVICE

FIELD OF THE INVENTION

The invention is related to the field of positioning. More specifically, the invention relates to a receiver and correlator which is used to determine the position of a wireless device.

BACKGROUND OF THE INVENTION

Currently, there are several global positioning systems designed to determine geographic location of wireless cellular devices and these systems may use any one of several available techniques to determine geographic position.

Each of these techniques has advantages and disadvantages and the particular technique utilized will depend upon the physical embodiment of the global positioning system used and the desired accuracy. Among these techniques are included an Angle of Arrival/Angle of Incidence technique and a Time of Arrival/Time Difference technique.

Systems which utilize an Angle of Arrival/Angle of Incidence technique to determine the location of a wireless device will include several base stations which are positioned at fixed known locations. In this configuration, the wireless cellular device is configured to transmit a known signal or data pattern at regular time intervals. This signal is received at each base station and the angle of arrival or angle of incidence is determined. Using the angle of arrival at each of the several base stations, the location of the wireless device can be calculated using well known triangulation techniques. This technique, is fairly inexpensive to implement. However, it assumes a direct line of sight between each of the base stations and the wireless device. Accordingly, if the signal from the wireless cellular device has been reflected or redirected in any way before it is received at a base station, the angle of arrival or angle of incidence information for that signal will not accurately reflect the position of the wireless device. Accordingly, this technique is not ideal for determining position of a wireless in areas of heavy foliage or large structures, such as in high rise buildings.

Other global positioning designs use a Time of Arrival Technique in order to determine the location of the wireless cellular device. Systems which utilize a Time of Arrival technique to determine the location of a wireless device also utilize base stations which are positioned at fixed known locations. In a Time of Arrival technique, each base station is configured with its own internal clock. Using this technique, the wireless device is configured to transmit known signals or data patterns at regular time intervals. These signals are received and recognized at each base station. The arrival time at each station is recorded using the internal clock of that station. Based upon the difference in arrival time at each station, the known speed of the signal, and the fixed locations of the stations, the position of the wireless device can be determined using hyberbolic navigational equations.

One draw back to this approach is that the internal clocks in each base station must accurately reflect correct time information in order for the time difference to be accurate. Only when the internal clocks of all base stations are synchronized to indicate the same time information will the time difference of arrival between each base station be accurate.

Each of these systems has been limited to wireless cellular devices, which do not always operate in areas of heavy foliage or large structures, such as in high rise buildings. Accordingly, what is needed is a technique for accurately determining the position of a wireless device using a Time of Arrival technique which will operate indoors.

SUMMARY OF THE INVENTION

The invention includes a method and apparatus for determining the global position of a wireless device using existing wireless (LAN and WAN) networks and a series of receiver/correlator devices implemented within such networks. In a preferred embodiment, these receiver/correlators are coupled to receive and transmit information packets in an existing packet based wireless network. Each receiver/correlator is positioned at a fixed location. Each receiver/correlator includes a transceiver, a local internal clock, and a synchronization packet detector (SPD) which recognizes synchronization packets and position request packets. In a preferred embodiment, the internal clocks of each receiver/correlator are synchronized and syntonized using synchronization packets. When these packets are transmitted or received, they create time stamp events within receiver/correlators. The time stamps events are used to synchronize and syntonize the internal clocks of each receiver/correlator.

Additionally, the receiver/correlators each include a transceiver for receiving position request packets from wireless devices. Using cross-correlation techniques, position request packets are received and recognized. This generates a time stamp event, indicating the time of reception. In a preferred embodiment, time stamp events are generated for each bit as it is received and identified.

After a position request packet has been received and recognized, and a time stamp generated using the internal clock of the receiver/correlator, the receiver/correlator will create a timing packet which includes information about the received position request packet, including the position request packet id or number, the identifier for the wireless device which sent the position request packet, and the time stamp of reception of the position request packet at the receiver/correlator. This timing packet is then sent to a central server using the transceiver of the receiver/correlator.

The central server receives timing packets from various receiver/correlators and matches up the information in each timing packet with information in other timing packets related to the same position request packet. Accordingly, the central server will receive a first timing packet from a first receiver/correlator containing information about position request packet R. The central server will also receive timing packets from at least three other receiver/correlators, each timing packet containing information about position request packet R. This information will include the time of arrival of the position request packet R at each of the receiver/correlators. Using the difference between receive time stamps for the same position request packet at different receiver/correlators, the geographic position of the wireless cellular device can be determined using known triangulation techniques and hyberbolic equations.

Once the position of the wireless device has been determined, the central server creates a position information packet which includes the identifier of the wireless device and information about the location of the wireless device. The position information packet may also contain additional information, such as directions to a nearby restaurant or hotel, or the number of miles to the nearest city or landmark. The central server then sends this position information packet out over the existing wireless network to the intended wireless device which transmitted the original position request packet.

DETAILED DESCRIPTION OF THE PREFERRED EMBODIMENTS

Figure 1:
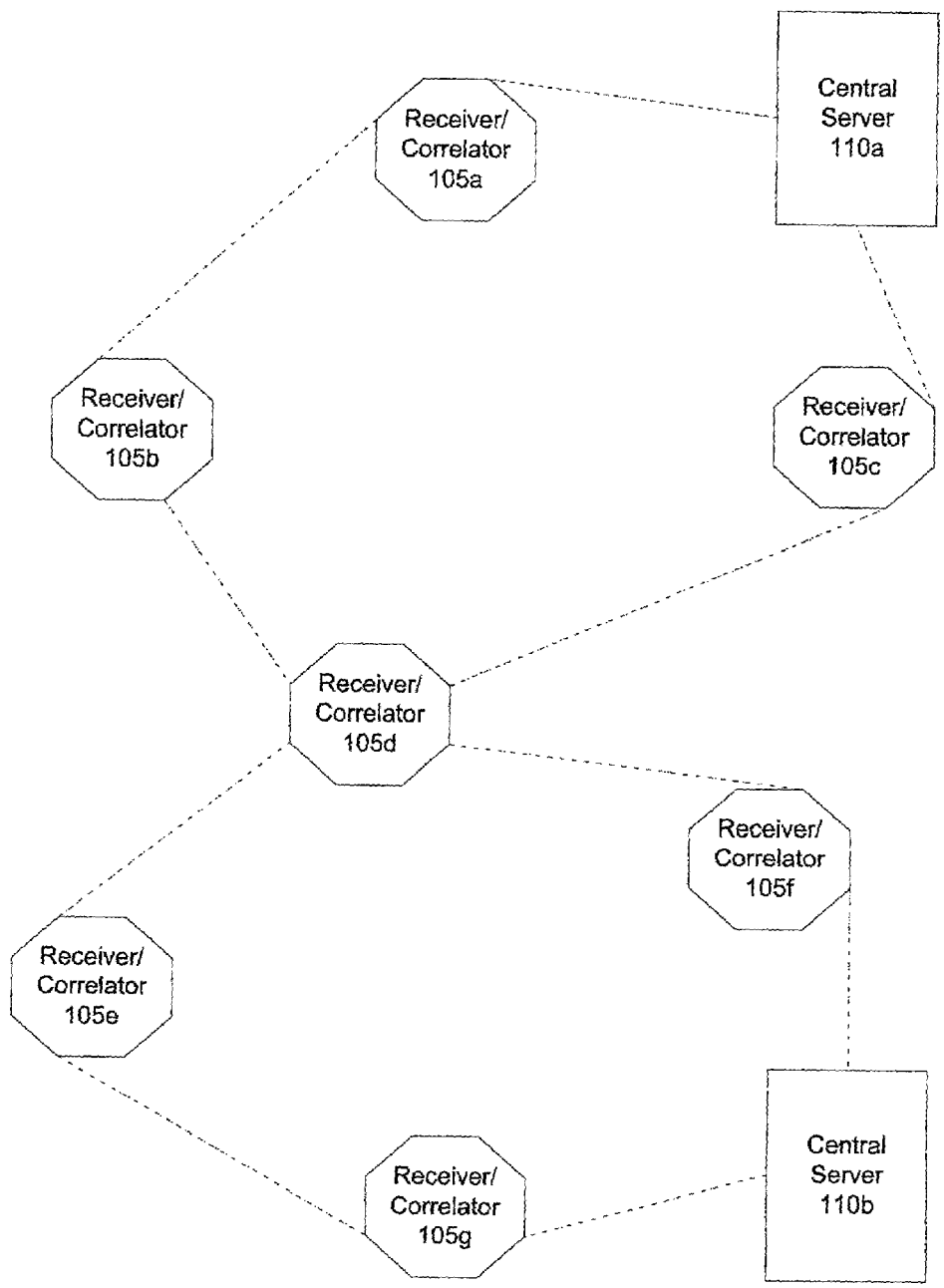
FIG. 1 is a functional block diagram which illustrates a wireless cellular network in which a preferred embodiment of a receiver/correlator of the present invention is implemented.

The invention includes a method and system for determining the global position of a wireless device (such as a cellular phone or PDA) using an existing packet based wireless communications network and a series of receiver/correlator devices. The system determines the position of the wireless device and transmits position information back to the wireless device.

In a preferred embodiment, the system of the present invention utilizes an existing wireless packet based network environment and communications protocol. In a preferred embodiment, the system includes a plurality of receiver/correlators configured within the existing wireless network which use packet based communications. Each receiver/correlator is positioned at a fixed location. Each receiver/correlator includes a transceiver for receiving and transmitting information packets in the wireless cellular network, a local internal clock, and a synchronization packet detector (SPD) which recognizes synchronization packets and position request packets. In a preferred embodiment, the SPD includes an auto correlator which uses cross-correlation techniques in order to recognize position request packets.

Each receiver/correlator is designed to recognize position request packets by correlating received packets with a known predetermined bit pattern. In a preferred embodiment, each receiver/correlator also includes a timing packet generator (TPG) for generating timing packets which contain information about previously received position request packets and receive times of such packets.

In a preferred embodiment, synchronization packets originate from any one of the receiver/correlators in the wireless cellular network and are transmitted between the other receiver/correlators within the network, in order to synchronize and syntonize the internal clocks of each receiver/correlator. Preferably, select receiver/correlators generate these synchronization packets at fixed intervals in time and transmit these packets out to other receiver correlators within a fixed geographic area. Accordingly, over a very large wireless cellular network, multiple receiver/correlators may generate synchronization packets in order to synchronize the clocks of all the receiver/correlators within several fixed geographic areas.

In a preferred embodiment, the receiver/correlators also receive position request packets from a wireless cellular device. These packets contain information which identifies the particular wireless cellular device which transmitted the packet and also contain packet identification information. These position request packets have known bit patterns and are recognized using an auto correlator within the receiver/correlators, said auto correlator being configured to recognize these packets using any one of several known auto correlation techniques. The synchronization packet detectors within each receiver/correlator within a fixed geographic area recognize these position request packets and create time stamped events, indicating the time of reception of these position request packets. Accordingly, in a preferred embodiment, the time of reception is actually a $\Delta t$ (delta time) which is the time elapsed between the reception of a synchronization packet and the reception of the current position request packet.

Timing packet generators within the receiver/correlators then generate timing packets which contain information about previously received position request packets received from wireless devices, and the times they were received. This information is sent to a central server for processing, wherein the central server monitors each receiver/correlator within a specific geographic region. Using this information from various receiver/correlators, the central server can determine a difference between time stamps of the same position request packet at different receiver/correlators. Using this time difference, the central server can use known hyberbolic equations and navigational techniques to determine the geographic position of the wireless device.

In a preferred embodiment, once the central server determines the location of the wireless device, it sends position information back out to the device via the existing wireless communications network. This information can be the geographic position in latitude and longitude, it can be an address, or it may be a map with distance to nearby locations and/or cities.

Wireless Cellular Network Configuration

FIG. 1 is a functional block diagram which illustrates a wireless cellular network in which a preferred embodiment of a receiver/correlator of the present invention is implemented. As shown, the wireless cellular network is comprised of a plurality of receiver/correlators 105a–g. The receiver/correlators 105a–g are preferably spread a maximum distance of up to 30 meters from each other, within a line of sight from each other. The receiver/correlators 105a–g are wirelessly coupled within an existing wireless network which uses packet based communications. The receiver/correlators are configured to receive signals from wireless devices (such as cellular phones or personal digital assistants (PDA's)) within the network. The wireless network further includes a plurality of central server/service sites 110*a–b*, each of which controls and monitors the operations of a subset of all the receiver/correlators (105*a–d* or 105*d–g*) in the network, the subset being defined by all those receiver/correlators within the central server's 110*a–b* controlled area. Accordingly, there are multiple central servers 110*a–b*, each such one configured to monitor and control a group of the receiver/correlators (110*a* monitors 105*a–d* and 110*b* monitors 105*d–g*) in the network within its controlled area such that every receiver/correlator 105*a–g* is monitored and controlled by at least one central server/service site 110*a–b*.

Receiver/Correlators

In a preferred embodiment, each receiver/correlator is equipped with a synchronization packet detector (SPD). In a preferred embodiment, the SPD is configured to identify both synchronization packets and position request packets. Alternatively, a synchronization pulse may be used instead of a synchronization packet, and the SPD may be configured to identify the synch pulse along with the position request packets using cross-correlation techniques.

In a preferred embodiment, the SPD includes a correlator which identifies these packets as they are received by comparing them to known bit patterns. Preferably, this is done on a per bit basis as each bit is received. In a preferred embodiment, the SPD samples incoming data at a known speed which is approximately equal to the inverse of the rise and fall times for a bit rising or falling edge.

Accordingly, in a preferred embodiment where a receiver/correlator has an internal clock which is running at 100 Mz, each clock period is 10 ns. Assuming the wireless cellular device sends packets having a bit duration time of 100 ns with a rise time of perhaps 10 ns. A receiver/correlator can measure the time between bits to a resolution of +/–1/10 of a bit (i.e., +/–10 ns). As the timing resolution is related to the rise time of the bit, not its duration. Alternatively, the SPD may sample over an entire bit period in order to determine whether the bit is high or low.

In a preferred embodiment, each position request packet has a predetermined header portion having a known bit pattern. The correlator uses known cross-correlation techniques to compare the bits in the header of each packet as it is received with the corresponding bit in the known bit pattern. Once, the correlator has received enough matching bits, it identifies the packet as a position request packet. Accordingly, when a position packet is received at a receiver/correlator, the SPD samples the bits in the header and generates a trigger signal on the reception of each bit in the packet, such that the time will be recorded consecutively as each bit in the packet is received.

In a preferred embodiment, the position request packet has a header which includes a recognizable bit pattern which matches the known bit pattern and which identifies the packet as a position request packets. All position request packets have this header. In an embodiment where the correlator also identifies synchronization packets, each synchronization packet also has a header which includes a recognizable bit pattern which matches a second known bit pattern and which identifies the packet as a synchronization packet. All synchronization packets have this header.

In a preferred embodiment, the receiver/correlator samples at a rate which is preferably the inverse of a rise and/or fall time such that if a bit has a period of 100 ns but the rise and/or fall time is 10 ns, the present invention can sample at a faster (i.e. 1/10 of the entire bit period). If a rising edge is detected during the sampling period, then the bit is a high bit, and if a falling edge is detected then the bit is a low bit. The correlator compares the received bits in the header of the packet with a copy of the known bit pattern for a position request packet in order to determine whether the packet is a position request packet. Alternatively, the correlator compares the received bits in the header of the packet with a copy of the known bit pattern for a synchronization packet in order to determine if the packet is a synchronization packet. In a preferred embodiment, known correlation techniques are used to compare the bits over time in order to determine whether the packet is a position request packet or a synchronization packet. The actual receive time of the packet is then determined by averaging the receive times recorded for each bit over the total packet.

Synchronization packets will include a field for identifying the receiver/correlator from which they initiated, and a field containing timing information about the internal clock of the receiver/correlator which transmitted the packet. The receiver/correlator which receives and recognizes the synchronization packet then compares the contents of the synchronization packet with its own receive time indicated on its internal clock. Assuming each receiver/correlator is at a fixed location and the packets travel at a known speed—i.e. the speed of a radio signal, the receiver/correlator which receives the synchronization packet can calibrate its own internal clock, taking into account the known propagation delay of the packet.

Reception of the synchronization packets are also treated as time stamp events. The time stamps at each receiver/correlator are then reported to other receiver/correlators and compared with the time stamps recorded at those other receiver/correlators in order to synchronize the internal clocks of each receiver/correlator within a geographic area.

Figure 2:
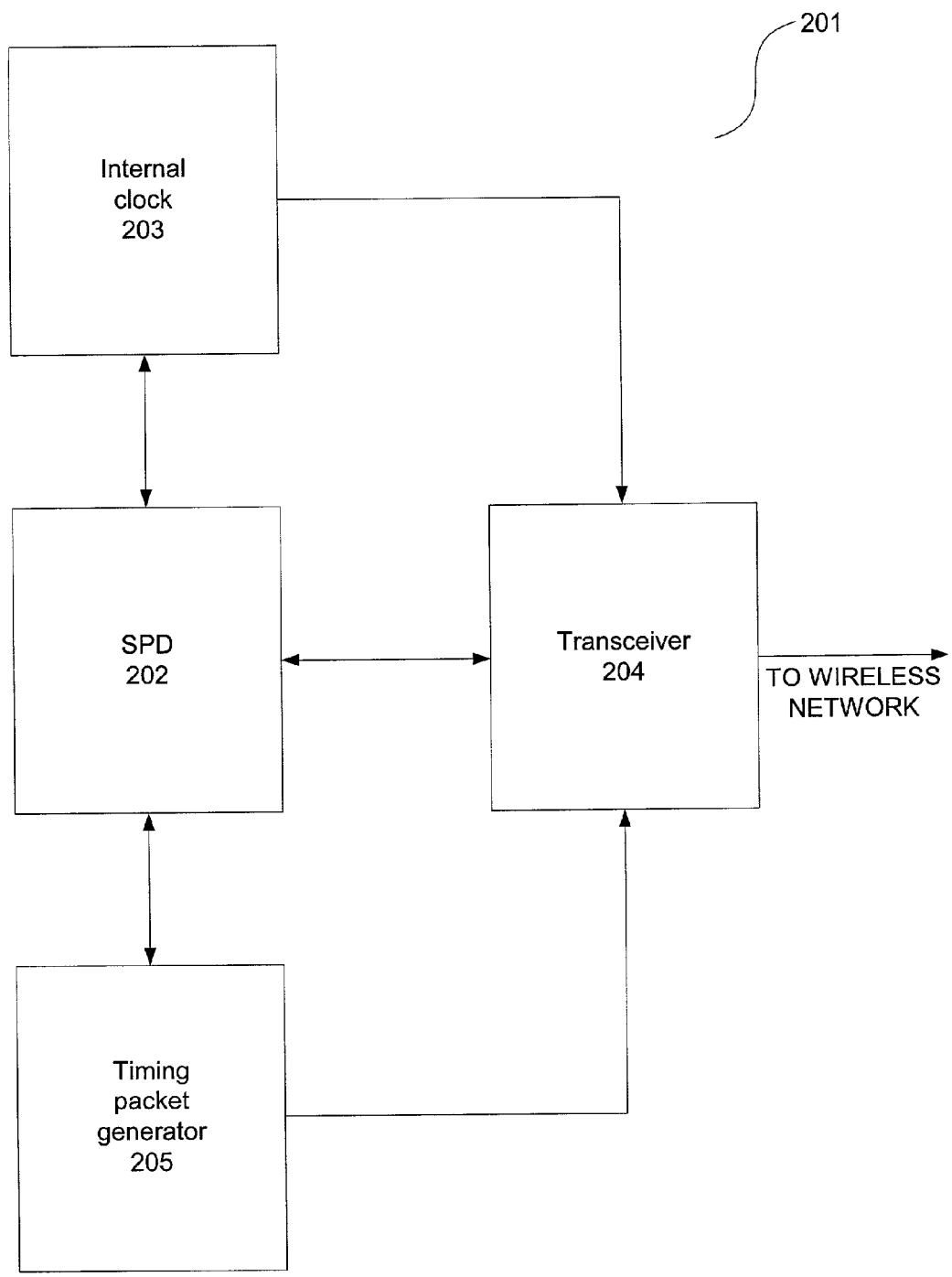
FIG. 2 illustrates a functional block diagram for a receiver/correlator in accordance with a preferred embodiment of the present invention.

FIG. 2 illustrates a functional block diagram for a receiver/correlator 201 in accordance with a preferred embodiment of the present invention. As shown, the receiver/correlator 201 includes a synchronization packet detector (SPD) 202 coupled to an internal clock 203, a transceiver block 204, and a timing packet generator 205. The transceiver block is also coupled to the internal clock 203 and the timing packet generator 205. The transceiver block 204 is further coupled to a wireless communications network for receiving and transmitting information packets over the network.

The transceiver block 204 receives and transmits information packets via the wireless communications network. These information packets may be synchronization packets, position request packets and timing packets. The SPD 202 monitors these information packets as they are received and detects when synchronization packets or position request packets are received. In a preferred embodiment, the SPD 202 includes a correlator which compares bits of each packets as they are received with known bit patterns and utilizes know cross-correlation techniques in order to determine when a synchronization packet or position request packet has been received. When synchronization packets or position request packets are detected, the SPD creates time stamps using the local time on the internal clock 203. These time/stamps are then used to either adjust the internal clock 203 (in the case of time stamps created from synchronization packets) or create timing packets for determining the global position of a wireless cellular device within the network (in the case of time stamps created from position request packets).

Preferably, the process of synchronization/syntonization occurs at regular intervals. In a preferred embodiment, these intervals occur at times just before the transmission of a position request packet from a wireless cellular device (i.e.

at intervals shorter than those used by the wireless cellular device for transmitting a position request packet). Accordingly, the internal clocks of the receiver/correlators have just been synchronized and syntonized before any position request packets are transmitted from a wireless cellular device and received by the receiver/correlator. Therefore, in a preferred embodiment, the time stamps created when position request packets are received actually represent a at (delta time) which is a time difference from the time the last synchronization packet was received through the time the current position request packet was recognized.

In a preferred embodiment, wireless devices are programmed to transmit position request packets at regular intervals in time. Along with a predetermined header portion, as described earlier, these packets also contain information for identifying the position request packet (such as a packet number) along with information for identifying the wireless device from which the packet is transmitted (such as a serial number or product code). In a preferred embodiment, each wireless device has a unique serial number or product code.

Position request packets are specialized packets which are also recognizable by the SPD in a receiver/correlator. Preferably, they contain unique header information which identifies these packets as position request packets. In a preferred embodiment, the reception of position request packets at a receiver/correlator creates a time stamp event. The receive time, the identity of the particular position request packet with which it corresponds, and the unique serial number or product code for the transmitting wireless device (so that the receiver/correlator can tell which wireless device is requesting position information) are preferably all stored in a memory or register.

Later, this information will be transmitted to a central server in a timing packet and matched up with timing information from other receiver/correlators for the same position request packet in order to determine the location of the wireless cellular device.

Synchronization and Syntonization Process

In a preferred embodiment, a first receiver/correlator within a controlled area is configured to generate and transmit a synchronization packet to a second receiver/correlator within the controlled area so that the second receiver/correlator within the controlled area may be synchronized to the first receiver/correlator. The synchronization packet will contain information identifying the transmitting receiver/correlator and the time of transmission of the synchronization packet, as indicated by the internal clock within the transmitting first receiver/correlator.

When a synchronization packet is detected by the second receiver correlator within the controlled area of the wireless cellular network, the second receiver/correlator generates a trigger signal, which is used to record the time at which the synchronization packet was received by the second receiver/correlator. The time recorded is the time on the internal clock of the second receiver/correlator when the synchronization packet was detected.

Since the location of the receiver/correlators is fixed and the packets travel at a known speed, the internal clock of the second receiver correlator can be adjusted and synchronized to the internal clock of the first receiver/correlator with a high degree of accuracy.

Figure 3:
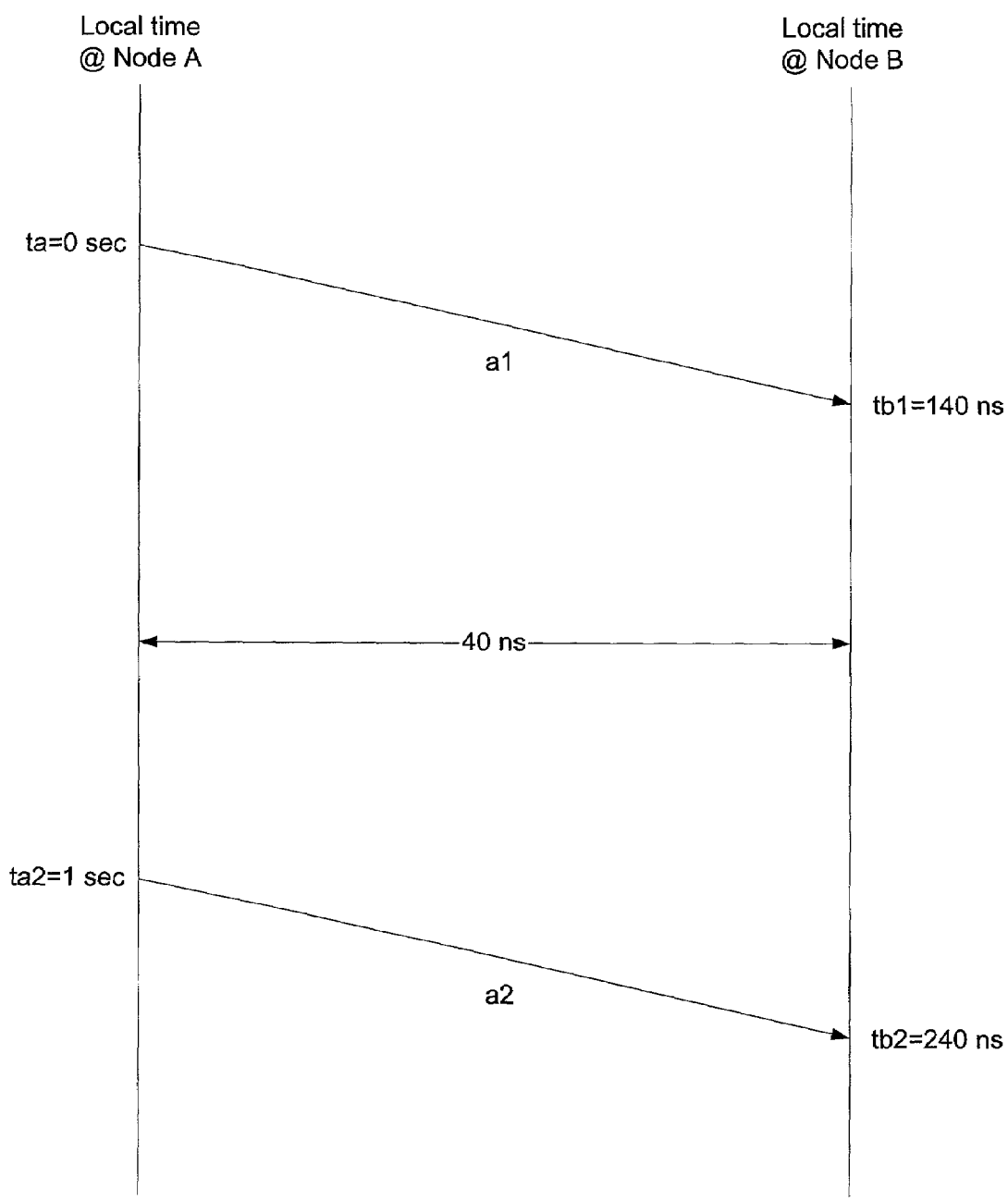
FIG. 3 illustrates a timing diagram which shows how synchronization packets are used to adjust the local clocks of two receiver/correlators so that they are synchronous and syntonous

FIG. 3 illustrates a timing diagram for using synchronization packets to adjust the local clocks of two receiver/correlators so that they are synchronous and syntonous. In the timing diagram of FIG. 3, Node A is the receiver/correlator which initiates the process by generating the synchronization packet. Assume for illustration purposes that the two receiver/correlators are at know fixed locations with a propagation delay between the two receiver/correlators of 40 ns.

As illustrated in FIG. 3, the receiver/correlator at Node A generates a synchronization packet a1 and transmits this synchronization packet at time ta1=0 sec to a second receiver correlator at Node B. The receiver/correlator at Node B receives the synchronization packet a1 at time tb1=140 ns. Accordingly, there is an apparent time difference of 140 ns between Node A and Node B. Since the receiver/correlator at Node B knows the actual propagation delay (it actually knows the speed of the packets and the distance between Node A and Node B; but, from this it determines the propagation delay to be approximately 40 ns), and concludes that its internal clock is ahead of the internal clock in the receiver/correlator at Node A by 100 ns. The second receiver/correlator then synchronizes its internal clock, accordingly.

Further assume that the receiver/correlator at Node A sends a second synchronization packet a2 to the receiver/correlator at Node B at a time ta2=1 sec. If the receiver/correlator at Node B receives this synchronization packet at time tb2=240 ns, the receiver/correlator once again determines that there was a known propagation delay of 40 ns and it then concludes that its internal clock is ahead by 200 ns. Accordingly, it will synchronize its internal clock by adjusting it back 200 ns. Moreover, the receiver/correlator at Node B also knows that 1 sec passed between the time the receiver/correlator at Node A transmitted the first synchronization packet a1 and the second synchronization packet a2. But, only 100 ns passed at the receive side between the time the first packet was received and the second packet was received. Furthermore, 40 of those 100 ns can be attributed to propagation delay. Accordingly, the receiver/correlator will syntonize its clock speed by decreasing its internal clock speed.

Figure 4:
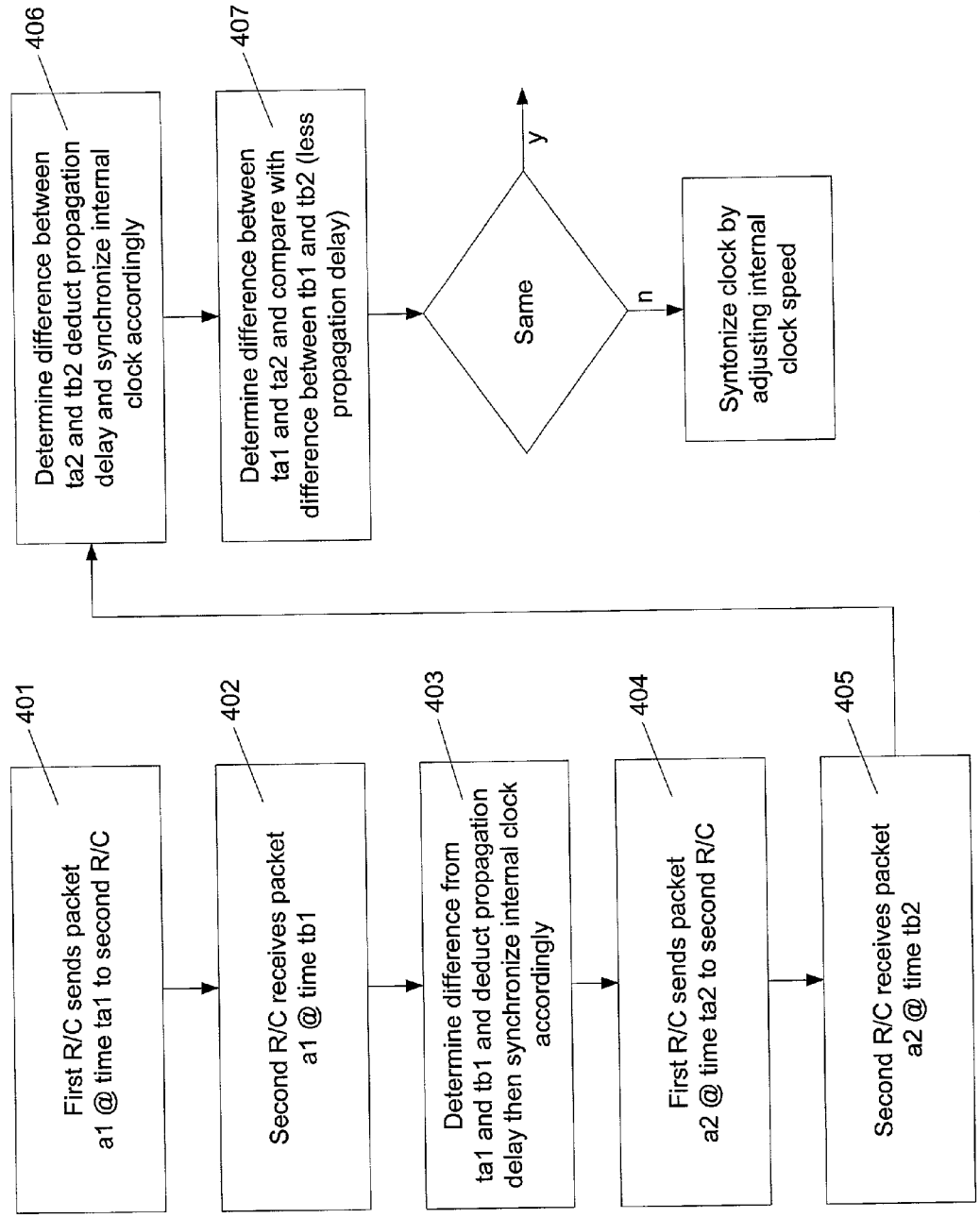
FIG. 4 illustrates a flowchart which shows the steps for synchronizing and syntonizing the internal clocks of a receiver correlator, in accordance with a preferred embodiment of the present invention.

FIG. 4 illustrates a flow diagram which shows the steps for synchronizing and syntonizing the internal clocks of two receiver/correlators in accordance with a preferred embodiment of the present invention. A first receiver/correlator sends a first synchronization packet a1 at a time ta1 to a second receiver/correlator 401. The second receiver/correlator receives the packet a1 at a time tb1 402. The second receiver/correlator then determined the difference between the time ta1 and tb1, deducts the appropriate time attributable to the propagation delay, and then synchronizes its clock accordingly 403. The first receiver/correlator then sends a second synchronization packet a2 at a time ta2 to the second receiver/correlator 404. The second receiver/correlator receives the packet a2 at a time tb2 405. The second receiver/correlator then determines the difference between tb2 and ta2, deducts the appropriate time for the propagation delay, and synchronizes its internal clock accordingly 406. Additionally, the second receiver/correlator also determines the difference between the times ta1 and ta2 and compares this with the difference between the times tb1 and tb2 407. If the difference between ta1 and ta2 is the same as the difference between tb1 and tb2 (factoring in the delay attributable to propagation), then the internal clocks in the first and second receiver/correlators are running at the same speed. If not, then the second receiver/correlator will syntonize its internal clock by adjusting its clock speed up or down, as necessary 408.

Position Request Packets

Figure 5:
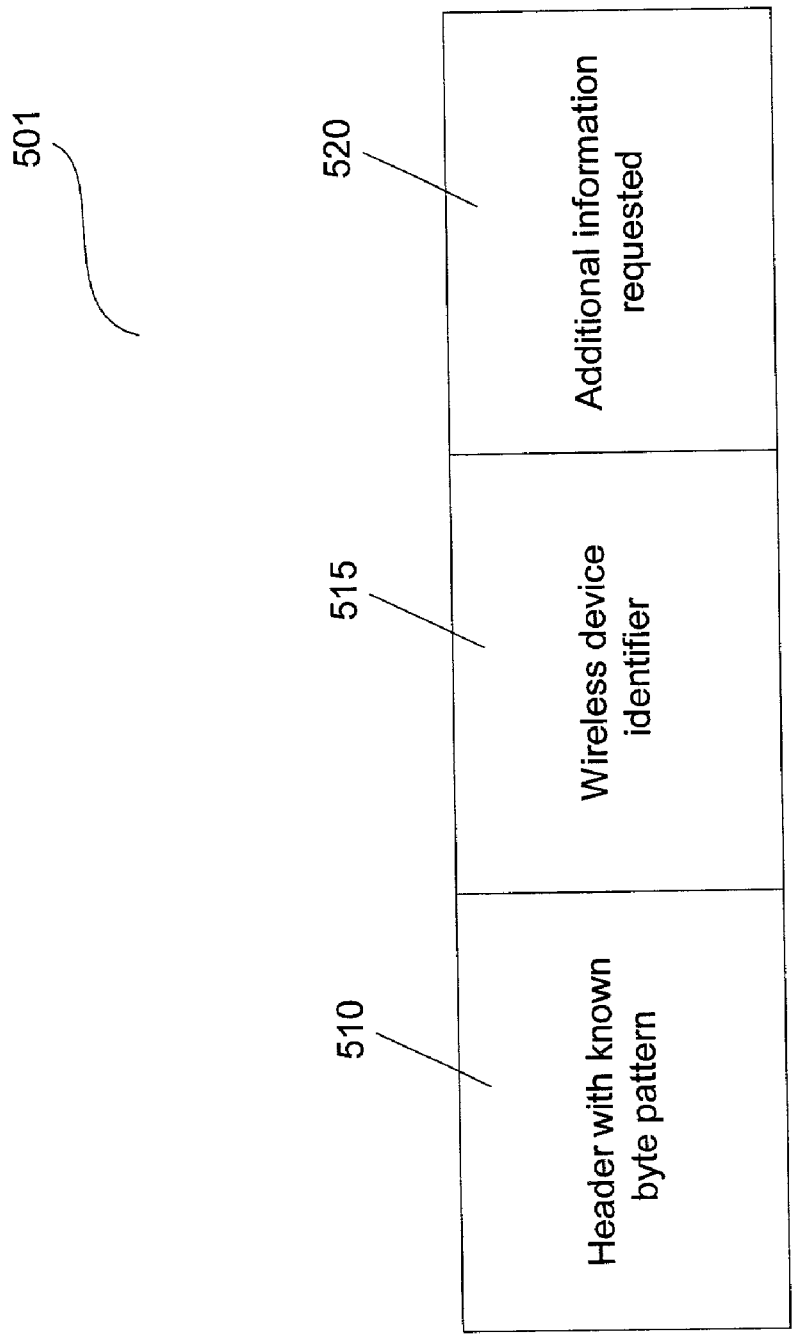
FIG. 5 illustrates the preferred content of a position request packet which is transmitted from a wireless device to a receiver/correlator.

FIG. 5 the preferred content of a position request packet 501 which is transmitted from a wireless device to a receiver/correlator. As shown, the packet includes a header portion 510 which includes the known bit pattern which identifies the packet as a position request packet. The packet also contains a field for identifying the wireless device from which it was transmitted 515. This is the field where the unique serial number or product code for the wireless device would appear. The position request packet may also optionally have an additional information field 520 which specifies any additional information the wireless device may require, such as miles to nearest city, driving directions, street address, etc.

Bit Pattern Correlation Techniques Used to Determine Receipt of Synchronization Packet or Position Request Packet As explained earlier, in a preferred embodiment of the present invention, position request signals are detected using a bit correlation technique. As each bit is detected its receive time is recorded, When the total number of corresponding bits have been detected sufficient to exceed a threshold indicating the packet is indeed a position request packet, the receive times for each bit are averaged and the average receive time is recorded, along with the packet identification information, in a register or memory of the receiver/correlator.

Accordingly, in a preferred embodiment where a receiver/correlator has an internal clock which is running at 100 Mz, each clock period is 10 ns. Assuming the wireless cellular device sends packets having a bit duration time of 100 ns with a rise time of perhaps 10 ns. A receiver/correlator can measure the time between bits to a resolution of +/−1/10 of a bit (i.e., +/−10 ns). As the timing resolution is related to the rise time of the bit, not its duration.

In a preferred embodiment, the correlator in the SPD determines whether the bit is high or low by comparing the level of the signal with some threshold over a sampling clock period, as sampled by the internal clock. If the signal does not exceed the threshold when the sampling the bit, the bit is determined to be low, if the signal level does exceed the threshold then the bit is determined to be high. Each bit is then compared to a corresponding bit in a known bit pattern which corresponds with the header of all position request packets. In this embodiment, a receiver/correlator can achieve timing resolution which is shorter than the total bit duration.

The next step is to go from bit resolution, to timing accuracy (i.e. accurately determining the time at which a position request or synchronization packet is received). In a preferred embodiment, timing accuracy is based on correlation with a pattern of bits; but, timing is maintained on a bit basis rather than packet basis. Assume, for example that a wireless cellular device sends a position request packet wherein the header includes a special, recognizable bit pattern such as: 0xFC200F01010FFFF00.

The receiver/correlator correlates against this full pattern, rather than just a single bit. Assuming that we have used a pattern which is unlikely to appear in the data (and this can be done by using link layer patterns which can't appear in the data), then we can measure the time between instances of this pattern to the resolution of the internal clock. Hence we are able to measure these time intervals to a resolution which is greater than the bit time on the link. The correlation against a long pattern increases our confidence that we are measuring the correct interval.

The invention improves resolution by increasing the clock rate of the internal clock in the receiver/correlator while keeping the bit times in any position request or synchronization packet constant. Of course, there are limits to this due to the accuracy of the threshold detection, limited rise time, noise, limited bandwidth of the correlation circuit, etc.

Determining Geographic Position

Figure 6:
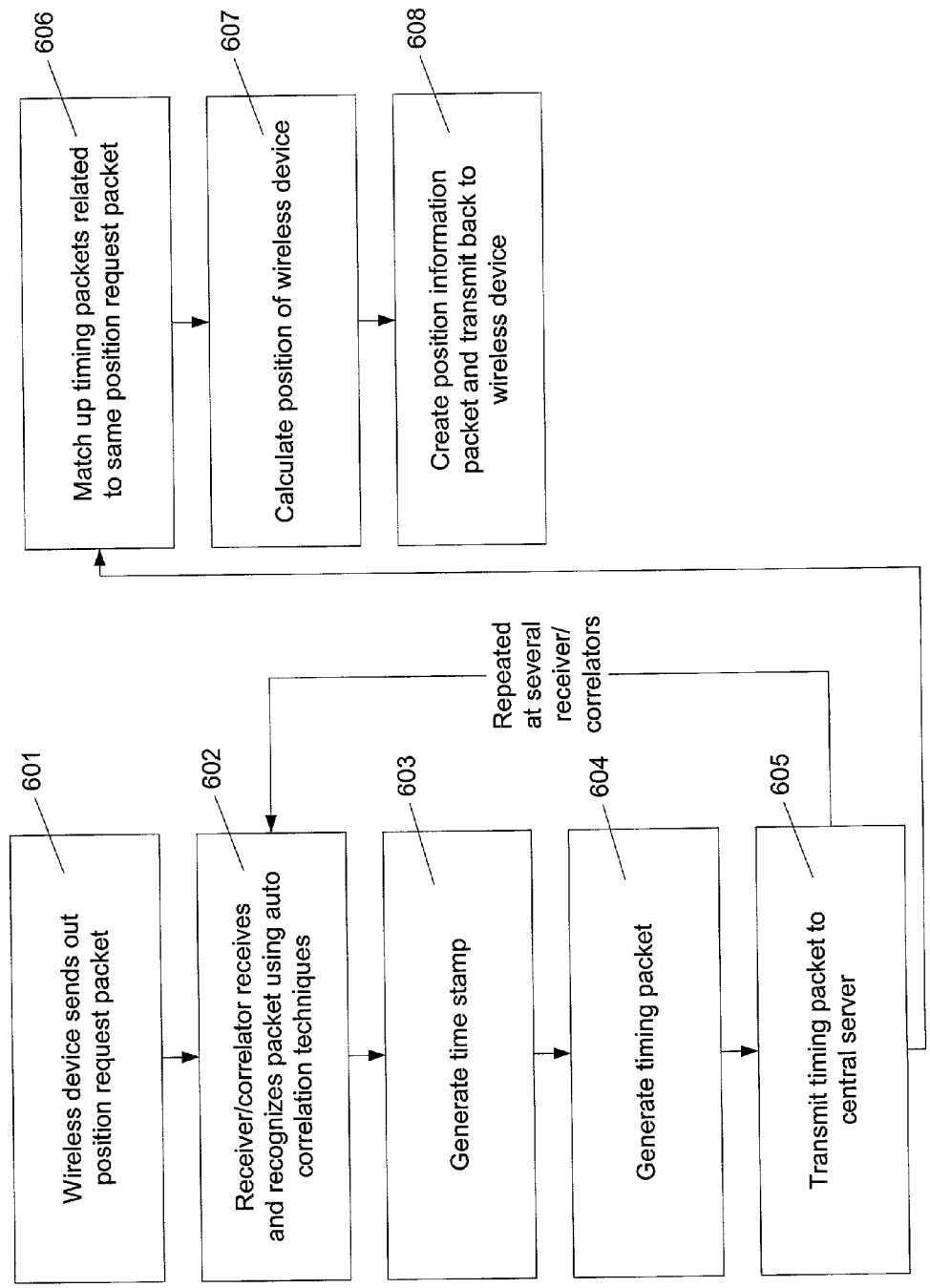
FIG. 6 illustrates a flowchart which shows the steps used to determine the geographic location of a wireless cellular device, in accordance with a preferred embodiment of the present invention.

FIG. 6 illustrates a flow chart which shows a preferred embodiment of the steps used to determine geographic position of a wireless device and to transmit position information back to the wireless device. As shown, the wireless device preferably initiates the process by sending out a position request packet 601. The position request packet is received at a receiver/correlator and recognized as a position request packet using auto correlation techniques 602. Once the packet has been received and recognized, a time stamp is generated indicated the time of reception of the packet, as indicated by the internal clock of the receiver/correlator 603. As indicated earlier, in a preferred embodiment, a time stamp is generated as each bit is recognized and once the packet is sufficiently identified as a position request packet, then a general time stamp is created by averaging these individual time stamps. Once the general time stamp has been generated, a timing packet is generated by the receiver/correlator, wherein this timing packet includes information about a received position request packet and the general time stamp which represents the time of reception 604. This timing packet also includes information identifying the position request packet with which it corresponds, information identifying the receiver/correlator which generated the timing packet, and information identifying the original wireless device which is requesting its position. The timing packet is transmitted out from the receiver/correlator to a central server 605. Steps 602 through 605 are repeated at several different receiver/correlators, each receiver/correlator receiving the position request packet, identifying the packet, generating time stamp information and then creating a timing packet which is transmitted to the central server.

At the central server, as each timing packet is received, it is matched up with other timing packets from other receiver/correlators which contain information related to the same position request packet 606. Using the timing information contained in the various timing packets, the central server calculates the position of the wireless device which transmitted the original position request packet using hyperbolic equations 607. After determining the position of the wireless device, the central server creates a position information packet which is transmitted out over the network, to the particular wireless device which initiated the position request 608. The position information packet will preferably contain information about the location of the wireless device, such as longitude and latitude coordinates, as well as additional information, such as miles to nearby city or names of nearby cross streets.

Figure 7:
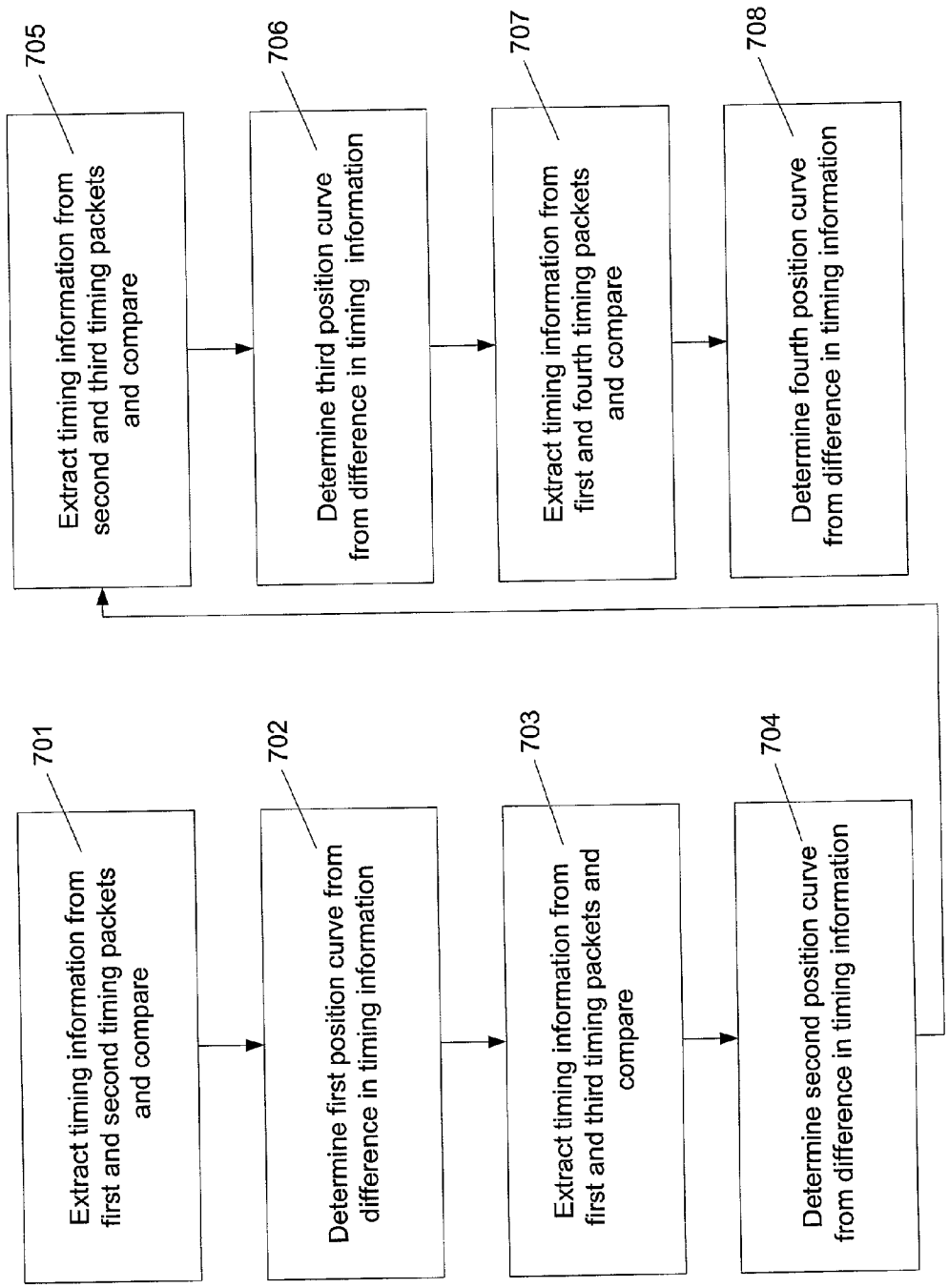
FIG. 7 illustrates the actual steps for calculating the geographic position of the wireless device using known triangulation techniques and hyberbolic equations.

FIG. 7 illustrates the actual steps for calculating the geographic position of the wireless device using known triangulation techniques and hyberbolic equations. As shown, the central server extracts timing information from a first timing packet received from a first receiver/correlator and timing information from a second timing packet received from a second receiver/correlator and determines a difference between the two timing informations 701. Based upon this difference in time, the known locations of the first and second receiver/correlators, and the known speed of the signal, the central server uses known hyperbolic equations in order to determine a first position curve along which the wireless device may be located 702.

The central server then extracts timing information from the first timing packet received from the first receiver/correlator and timing information from a third timing packet received from a third receiver/correlator and once again determines a difference between the two timing informations 703. Based upon this difference, the known locations of the first and third receiver/correlators, and the known speed of the signal, the central server uses known hyperbolic equations to determine a second position curve along which the wireless device may be located 704. This second position curve will intercept the first position curve at two locations, either of which may be the location of the wireless device.

The central server then extracts timing information from the second timing packet received from the second receiver/correlator and timing information from the third timing packet received from the third receiver/correlator and once again determines a difference between the two timing informations 705. Based upon this difference, the known locations of the first and third receiver/correlators, and the known speed of the signal, the central server uses known hyperbolic equations to determine a third position curve along which the wireless device may be located 706. This third position curve will intercept the first and second position curves at one location, which will determine the location of the wireless device.

In a preferred embodiment, the central server will extract timing information from the first timing packet received from the first receiver/correlator and timing information from a fourth timing packet received from a fourth receiver/correlator and once again determines a difference between the two timing informations 707. Based upon this difference, the known locations of the first and fourth receiver/correlators, and the known speed of the signal, the central server uses known hyperbolic equations to determine a fourth position curve along which the wireless device may be located 708. This fourth position curve will intercept the first, second and third position curves at one location, and ensure additional accuracy in determining the location of the wireless device.

Timing Packets

Figure 8:
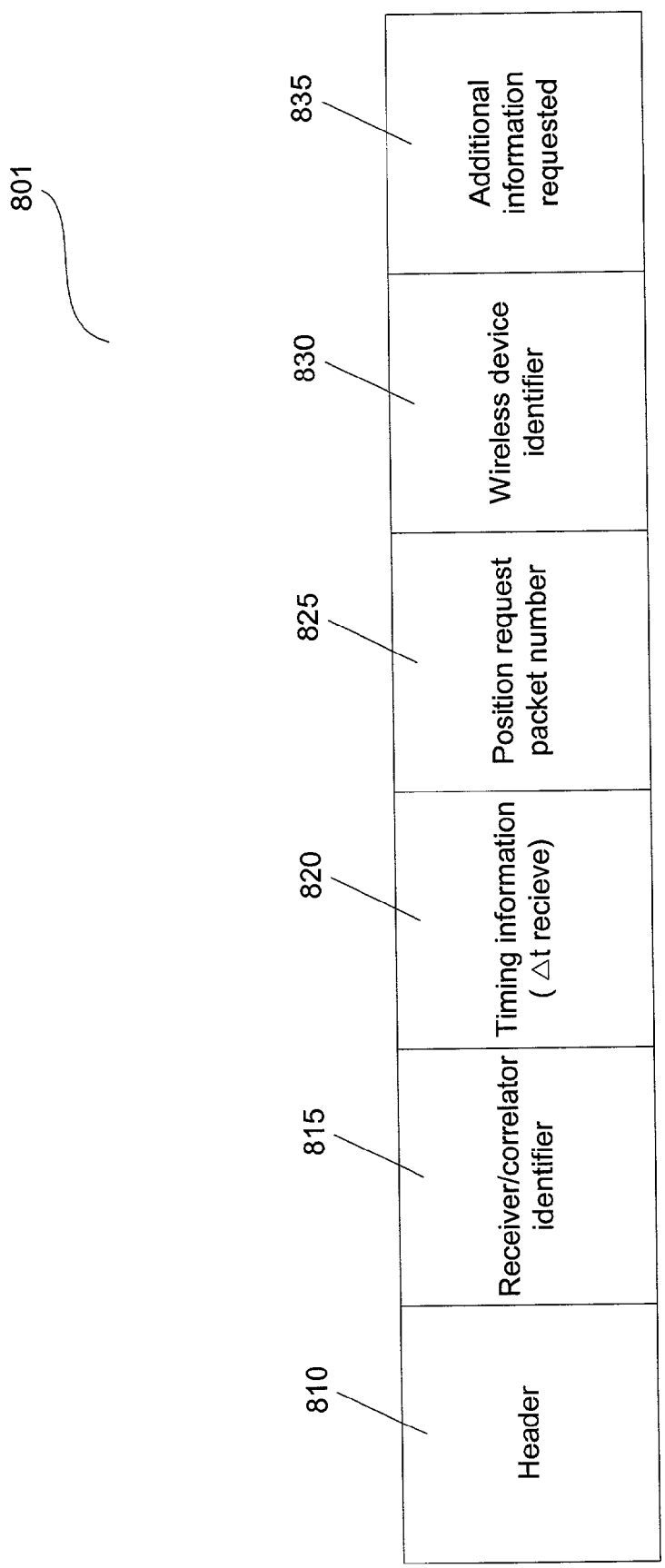
FIG. 8 illustrates the preferred content of a timing packet which is transmitted from a receiver/correlator to a central server.

FIG. 8 illustrates the preferred content of a timing packet which is transmitted from a receiver/correlator to a central server 801. As shown, the packet includes a header portion 810 which identifies the packet as a timing packet. The packet also contains a field for identifying the receiver/correlator from which it was transmitted 815. The timing packet will also include a field identifying timing information 820 (the Δt time at which the position request packet was received at the receiver/correlator) and a field identifying the corresponding position request packet 825. The timing packet will also include an information field identifying the wireless device from which the original position request packet was transmitted 830. The timing packet may also, optionally, include an additional information request field 835 which specifies any additional information the wireless device may require, such as miles to nearest city, driving directions, street address, etc.

Position Information Packets

Figure 9:
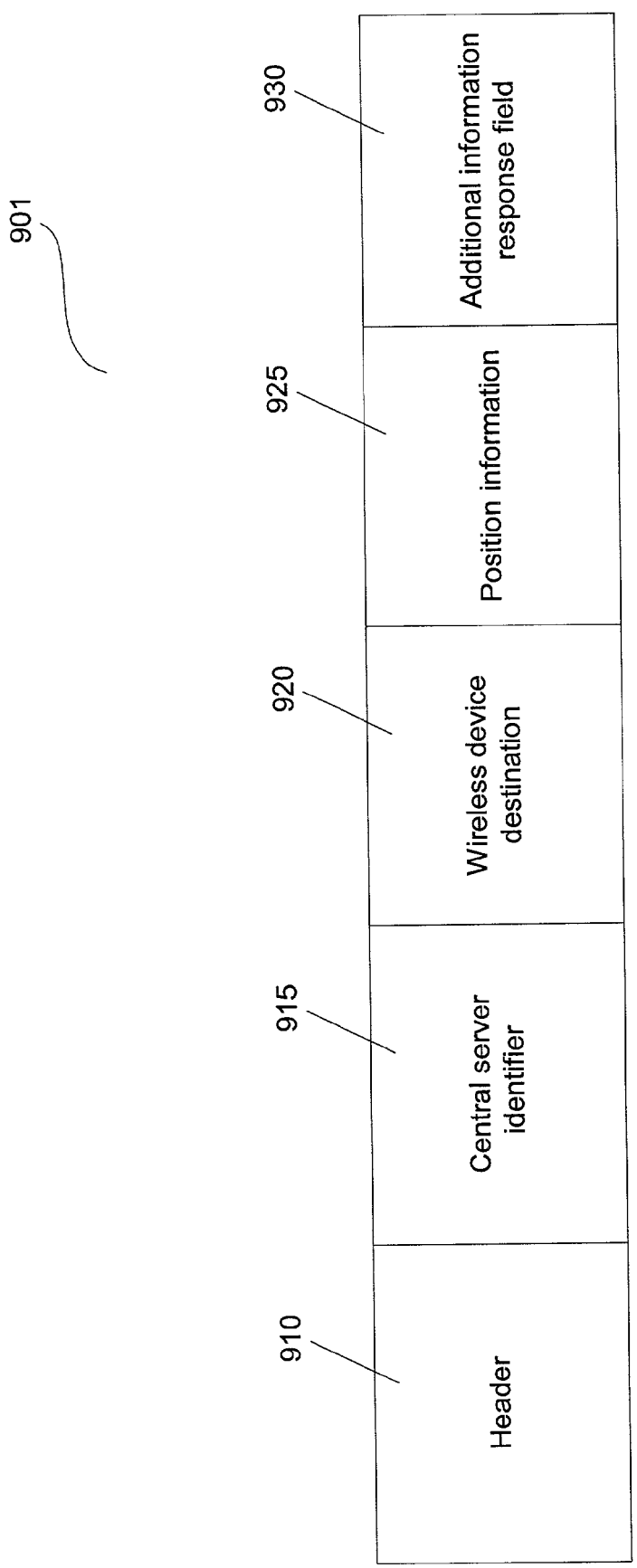
FIG. 9 illustrates the preferred content of a position information packet which is transmitted from a central server to a wireless device

FIG. 9 illustrates the preferred content of a position information packet 901 which is transmitted from a central server to a wireless device. As shown, the packet includes a header portion 910 which identifies the packet as a position information packet. The packet also contains a field for identifying the central server from which it was transmitted 915. The position information packet will also include an information field identifying

What is claimed is:

1. A method of determining the position of a wireless device using a wireless network having a plurality of receiver/correlators, each receiver/correlator being positioned at a fixed location in the wireless network, the method comprising:

receiving a position request from the wireless device at a first receiver/correlator and recording a receive time;

receiving the same position request from the wireless device at a second receiver/correlator and recording a receive time;

synchronizing all the receiver/correlators in the plurality of receiver/correlators such that an internal clock in each receiver/correlator is synchronized and syntonized to indicate a same time information, and wherein said synchronizing comprises:

transmitting a first synchronization packet from the first receiver/correlator to the second receiver/correlator, the first synchronization packet having a first transmit time at which the packet was transmitted from the first/correlator;

receiving the first synchronization packet at the second receiver/correlator and recording the receive time of the first synchronization packet;

comparing the first transmit time of the first synchronization packet with the receive time of the first synchronization packet recorded at the second receiver/correlator;

synchronizing an internal clock in the second receiver/correlator using a difference between the first transmit time and the receive time of the first synchronization packet, the known locations of the first and second receiver/correlators and a known propagation delay between the first and second receiver/correlators;

using the receive time of the position request recorded at the first receiver/correlator, the receive time of the position request recorded at the second receiver/correlator, and the fixed locations of each receiver/correlator to determine the position of the wireless device; and transmitting a position information packet back to the wireless device indicating the global position of the wireless device.

2. The method of claim 1, further comprising:

receiving the same position request from the wireless device at a third receiver/correlator and recording a receive time; and using the receive time recorded at the first receiver/correlator, the receive time recorded at the second receiver/correlator, the receive time recorded at the third receiver/correlator, and the fixed locations of each receiver/correlator to determine the position of the wireless device.

3. The method of claim 1, wherein said receiving a position request packet from the wireless device at a first receiver/correlator and recording the receive time further comprises:

detecting a reception of each bit in a header of the position request packet an using cross-correlation techniques to determine whether the bits match a known bit pattern;

recording a time each bit is detected; and averaging the recorded times for each bit thereby accurately generating a general receive time which indicates the time at which the position request packet is received.

4. The method of claim 3, wherein said detecting the reception of each bit in a header of the position request packet further comprises:

sampling incoming packets at a rate equal to an inverse of a rising or falling edge time and detecting any rising or falling edges;

determining whether the bit is high or low based upon the detection of a rising or falling edge; and comparing the bit detected to a bit in the same bit position in the known bit pattern.

5. The method of claim 1, wherein said transmitting a position information packet back to the wireless device indicating the global position of the wireless device further comprises:

a) creating a position information packet having:
   a header portion which identifies the packet as a position information packet;
   a field for identifying a central server from which it is being transmitted;
   an information field identifying the wireless device for which it is intended; and
b) transmitting the position information packet to the wireless device via a packet based network.

6. A system for identifying the position of a wireless device and transmitting that position back to the wireless device, the system comprising:

a plurality of receiver/correlators, each of said plurality of receiver/correlators being positioned at a fixed location in the network, and wherein each of said plurality of receiver/correlators performs a method for generating packets, comprising:

a) generating a trigger signal each time a position request packet is received from said wireless device, said trigger signal used to record a local time, as indicated by an internal clock, at which the position request packet is received; and b) generating at least one timing packet comprising information about said position request packet and further comprising said local time; and a central server for performing a routine for determining the position of the wireless device, said routing comprising;

determining a first position curve along which the wireless device may be located based upon a first timing difference between the timing information extracted from a first timing packet received from a first receiver/correlator and the timing information extracted from a second timing packet received from a second receiver/correlator the known locations of the first and second receiver/correlators, and known speed of the timing packets;

determining a second position curve along which the wireless device may be located based upon a second timing difference between the timing information extracted from said first timing packet received from said first receiver/correlator and the timing information extracted from a third timing packet received from a third receiver/correlator, the known locations of the first and third receiver/correlators and the known speed of the timing packets, and wherein said second position curve will intercept the first position curve at two locations, either of which may be the location of the wireless device; and determining a third position curve along which the wireless device may be located based upon a third timing difference between the timing information extracted from said second timing packet received from said second receiver/correlator and the timing information extracted from said third timing packet received from said second receiver/correlator, the known locations of the second and third receiver/correlators, and the known speed of the timing packets, and wherein the third position curve will intercept the first and second position curves at one location, which will determine the location of the wireless device.

7. A plurality of receiver/correlators coupled in a wireless packet based network and each having a fixed location, the receiver/correlators being used for determining the geographic position of a wireless cellular device, each receiver/correlator comprising:

an internal clock; and a synchronization packet detector for:
   detecting synchronization packets which are used to synchronizing and syntonizing the internal clock; and
   detecting position request packets from the wireless cellular device and generating a trigger signal each time a position request packet is received, the trigger signal used to record a local time on the internal clock at which the position request packet is received.

8. The plurality of receiver/correlators of claim 7, wherein each receiver/correlator further includes:

a timing packet generator for generating a timing packet which identifies a particular position request packet and the time it was received at the receiver/correlator, the timing packet being transmitted to a central server for processing.

9. A packet based communications system for receiving a position request from a wireless device and transmitting position information back to the wireless device, the packet based communications system comprising:

a receiver/correlator for transmitting a timing packet to a central server, wherein the timing packet having a header which identifies the packet as a timing packet, a field for identifying the receiver/correlator from which it was transmitted, a field identifying timing information which includes a Δt time at which the position request packet was received at the receiver/correlator, and a field identifying the corresponding position request packet;

the wireless device for transmitting the position request packet to the receiver/correlator, wherein the position request packet includes a header having a known bit pattern which identifies the packet as the position request packet, and a field for identifying the wireless device from which it was transmitted; and the central server for transmitting a position information packet to the wireless device, wherein the position information packet includes a header which identifies the packet as the position information packet, a field for identifying the central server from which it was transmitted, an information field identifying the wireless device for which it is intended, and a field identifying the position of the wireless device, as determined by the central server.

* * * * *